United States Patent
Touve et al.

(10) Patent No.: US 7,580,372 B2
(45) Date of Patent: Aug. 25, 2009

(54) SYSTEM AND METHOD FOR IMPLEMENTING MULTIPLE SPANNING TREE PROTOCOL AUTOMATIC 802.1Q TRUNKING

(75) Inventors: Jeremy Touve, Chatsworth, CA (US); Nalinakshan Kunnath, Calabasas, CA (US); Jagjeet Bhatia, Simi Valley, CA (US)

(73) Assignee: Alcatel Lucent, Paris (FR)

( * ) Notice: Subject to any disclaimer, the term of this patent is extended or adjusted under 35 U.S.C. 154(b) by 499 days.

(21) Appl. No.: 11/300,786

(22) Filed: Dec. 15, 2005

(65) Prior Publication Data

US 2007/0140147 A1 Jun. 21, 2007

(51) Int. Cl.
*H04L 12/28* (2006.01)
(52) U.S. Cl. .................................. 370/256; 370/401
(58) Field of Classification Search ......... 370/254–256, 370/401
See application file for complete search history.

(56) References Cited

U.S. PATENT DOCUMENTS

| 6,339,830 | B1 | 1/2002 | See et al. |
| 6,504,842 | B1 | 1/2003 | Bergenfeld |
| 6,937,576 | B1* | 8/2005 | Di Benedetto et al. ...... 370/256 |
| 7,292,581 | B2* | 11/2007 | Finn ...................... 370/395.53 |
| 2004/0081171 | A1* | 4/2004 | Finn ...................... 370/395.53 |
| 2005/0013260 | A1* | 1/2005 | Ramanathan et al. ....... 370/256 |
| 2006/0198323 | A1* | 9/2006 | Finn .......................... 370/256 |
| 2007/0064628 | A1* | 3/2007 | Tallet et al. ................. 370/256 |

FOREIGN PATENT DOCUMENTS

EP 1 545 068 A1 6/2005

OTHER PUBLICATIONS

K. Kompella et al.; "Virtual Private LAN Service"; Network Working Group-Internet Draft; http://www.watersprings.org/pub/id/draft-ietf-ppvpn-vpls-bgp-00.txt; May 2003; pp. 1-16.
Marc Lasserre et al.; "Virtual Private LAN Services over MPLS"; Internet Draft Document; http://www.ietf.org/internet-drafts/draft-ietf-l2vpn-vpls-ldp-08.txt; Nov. 2005; pp. 1-25.
Cisco Systems, Inc.: "Understanding Multiple Spanning Tree Protocol (802.1s)" Cisco White Paper, [Online] May 14, 2005, pp. 1-14 XP002426379. Retrieved from the Internet: URL:http://web.archive.org/web/20050514065955/www.cisco.com/warp/public/473/147.pdf> [retrieved on Mar. 23, 2007].
European Search Report; Application No. EP 06 02 5761; Publication No. EP 1 798 909 A1; Search Completed Mar. 23 2007; one page.

\* cited by examiner

*Primary Examiner*—Hong Cho

(57) ABSTRACT

System and method for performing automatic trunk formation in a multiple spanning tree protocol ("MSTP")-enabled bridge comprising a plurality of ports are described. In one embodiment, the method comprises determining which ones of the ports comprise MSTP trunk ports; forming an MSTP trunk group for each multiple spanning tree instance ("MSTI") comprising a group of Virtual Local Area Networks ("VLANs") belonging to the MSTI; and, for each of the MSTP trunk ports, determining whether a status of the MSTP trunk port is trunk active and if so, adding all VLANs in the MSTP trunk group of the MSTIs that are forwarding on the MSTP trunk port as tagged members of the MSTP trunk port.

23 Claims, 5 Drawing Sheets

SYSTEM AND METHOD FOR IMPLEMENTING MULTIPLE SPANNING TREE PROTOCOL AUTOMATIC 802.1Q TRUNKING

BACKGROUND OF THE INVENTION

1. Technical Field of the Invention

The present invention generally relates to Multiple Spanning Tree ("MST") protocol. More particularly, and not by way of any limitation, the present invention is directed to system and method for implementing automatic IEEE 802.1Q trunk formation in connection with MST protocol.

2. Description of Related Art

MST protocol ("MSTP"), as defined by IEEE 801.1s, combines the best aspects of both Rapid Spanning Tree Protocol ("RSTP") and virtual local area network ("VLAN") technology. In MSTP, several VLANs can be mapped to a single spanning tree instance, referred to as an MST instance ("MSTI"), and each spanning tree instance is independent of other spanning tree instances. Each MSTI is identified by an MSTI number, which is locally significant within a region; MSTIs do not span across MST regions. This approach provides multiple forwarding paths for data traffic, enabling load-balancing, and reduces the number of spanning tree instances required to support a large number of VLANs.

In MST protocol ("MSTP"), as defined in IEEE 802.1S, a problem exists in that the actual VLAN topology created by IEEE 802.1Q tagging is not taken into consideration when the active (forwarding) topology of the spanning tree is determined. Thus, in manual configurations of VLANS, where the logical VLAN topology differs from the active spanning tree topology, connectivity can be lost for those VLANS where the VLANs possible connecting routes between switches are all blocked on the spanning tree.

This possible connectivity loss can be demonstrated using an example of two redundant links between two bridges in the same MST region. A VLAN may be assigned to only one of the links, whereas the MSTI to which it belongs may have designated that link to be "blocking," rather than "forwarding" for the MSTI. As a result, connectivity for that VLAN, and possibly additional VLANs, is lost, even though a valid physical link exists. To configure the network correctly, the VLAN should be assigned to both links, so that despite the fact that one of the links is blocking, the VLAN still has a forwarding link. This simple example can be expanded upon with many VLANs and much more complicated physical topologies, but the root problem is still evident, and indeed the need for a simple and complete solution is made more apparent.

One way to partially obviate the problem is to let use Generic Attribute Registration Protocol ("GARP") VLAN Registration Protocol ("GVRP") to determine the VLAN topology, as GVRP uses only the forwarding path of the spanning tree to define the VLAN topology. Although GVRP can avert the problem if properly applied, it is not by any means a complete solution. In particular, GVRP suffers from deficiencies in terms of scaling, security, and resource allocation, to name a few. GVRP can be configured by management to also not provide sufficient protection from the problem of concern. GVRP presents an additional problem in that dynamic VLAN "learns" can result in reconvergence of the network Another partial solution is to use a system in which "infinite" path costs are assigned to given ports automatically for a specific spanning tree instance when not all of the VLANs that are mapped to the spanning instance are assigned to a port. In this manner, only links that have all of the VLANs assigned to them are favored by spanning tree when determining topology. This is done automatically with a specific algorithm. This solution also gives rise to additional problems. In particular, whenever VLAN topology changes, a path cost may change, which will in turn create a spanning tree topology change, which is undesirable. Moreover, this solution provides no protection against erroneous configurations, as many scenarios result in no port being favored. Additionally, configuration can be difficult in many scenarios in which an attempt is made to employ this solution.

Yet another partial solution is to filter MST instance ("MSTI") information in the MSTP bridge protocol data units ("BPDUs") based on whether the VLANs mapped to a particular MSTI exist on a specific port. This works because the MSTIs will converge only to be forwarding on good ports that have related VLANs; however, this solution is not compliant with the IEEE standard. There also exists the possibility of configuring a port as a trunk port, thus allowing all VLANs manually created in the system to be configured on the port. This solution is deficient in that it is not based exclusively on MSTP.

Therefore, what is needed is a system and method for implementing automatic trunk formation ("ATF"), or automatic trunking, in MSTP in a manner that is compliant with IEEE 802.1Q.

SUMMARY OF THE INVENTION

One embodiment is a method for performing automatic trunk formation in a multiple spanning tree protocol ("MSTP")-enabled bridge comprising a plurality of ports. The method comprises determining which ones of the ports comprise MSTP trunk ports; forming an MSTP trunk group for each multiple spanning tree instance ("MSTI") comprising a group of Virtual Local Area Networks ("VLANs") belonging to the MSTI; and, for each of the MSTP trunk ports, determining whether a status of the MSTP trunk port is trunk active and if so, adding all VLANs in the MSTP trunk group of the MSTIs that are forwarding on the MSTP trunk port as tagged members of the MSTP trunk port.

Another embodiment is a method of implementing automatic trunking in a multiple spanning tree protocol ("MSTP")-enabled bridge. The method comprises, responsive to initialization of the bridge, identifying which ones of the plurality of ports comprise MSTP trunk ports; and for each MSTP trunk port, for each multiple spanning tree instance ("MSTI") for which the trunk port is forwarding, adding virtual local area networks ("VLANs") belonging to the MSTI as a tagged member of the MSTP trunk port.

Another embodiment is a bridge for performing automatic trunk formation. The bridge comprises a plurality of ports; multiple spanning tree protocol ("MSTP") logic; and automatic trunk formation ("ATF") logic for determining which ones of the plurality of ports comprise MSTP trunk ports; forming an MSTP trunk group for each multiple spanning tree instance ("MSTI") comprising a group of Virtual Local Area Networks ("VLANs") belonging to the MSTI; for each of the MSTP trunk ports, determining whether a status of the MSTP trunk port is trunk active and if so, adding all VLANs in the MSTP trunk group of the MSTIs that are forwarding on the MSTP trunk port as tagged members of the MSTP trunk port.

Another embodiment is a system for performing automatic trunk formation in a multiple spanning tree protocol ("MSTP")-enabled bridge comprising a plurality of ports. The system comprises means for determining which ones of the plurality of ports comprise MSTP trunk ports; means for forming an MSTP trunk group for each multiple spanning tree instance ("MSTI") comprising a group of Virtual Local Area Networks ("VLANs") belonging to the MSTI; and means for determining for each of the MSTP trunk ports whether a status of the MSTP trunk port is trunk active and if so, adding all VLANs in the MSTP trunk group of the MSTIs that are forwarding on the MSTP trunk port as tagged members of the MSTP trunk port.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
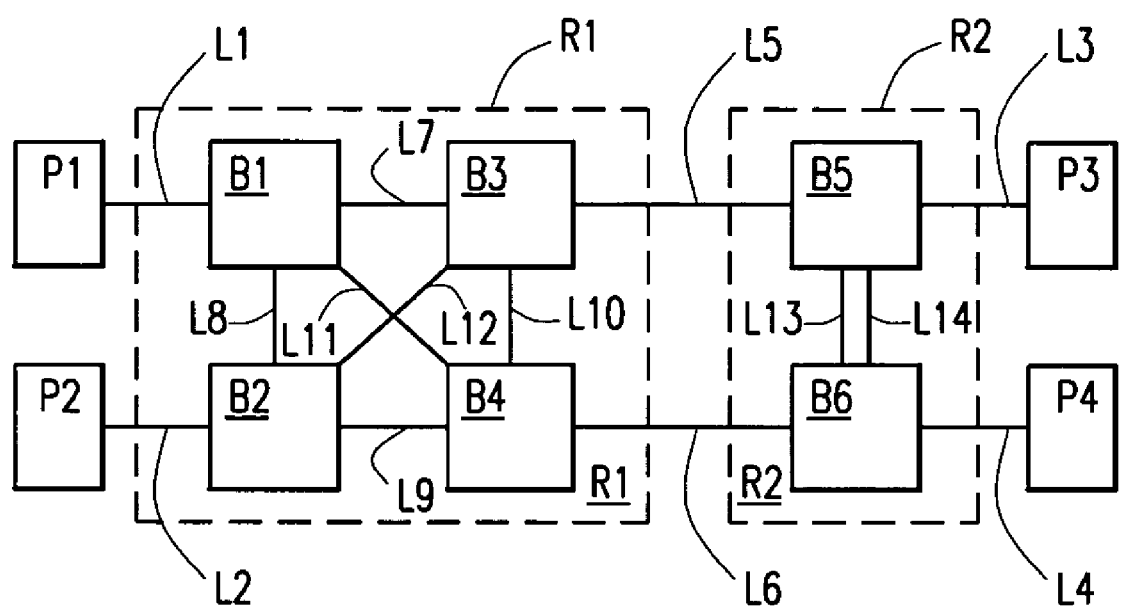
FIG. 1 is a system block diagram of a network in which an embodiment may be implemented.

Embodiments of the invention will now be described with reference to various examples of how the invention can best be made and used. Like reference numerals are used throughout the description and several views of the drawings to indicate like or corresponding parts, wherein the various elements are not necessarily drawn to scale.

In one embodiment, MSTP ATF, or automatic trunking, is intended to help solve the existing problem with MSTP in which resultant STP topologies of existing MSTIs diverge from the possible forwarding paths defined by the static VLAN topology. As previously noted, MSTP, as defined by IEEE 802.1S, does not tie 802.1Q VLAN topology into its forwarding decisions.

The embodiment described herein will help solve this issue by controlling the VLAN topology configuration on the links between bridges in the same MST region. The bridges must be in the same region, because the STP topologies are not linked, except through a common and internal spanning tree ("CIST"). The CIST is the default spanning tree instance of MSTP; that is, all VLANs that are not members of a particular MSTI are members of the CIST. It will be recognized that VLANs common to each of multiple regions can be mapped to different MSTIs within each of the regions. As a result, the VLANs effectively change meaning between regions and two bridges facing each other across a region boundary may assign different VLANs to ports facing each other if attempting to use the embodiment described herein. Moreover, a bridge that is across a boundary link from an MSTP bridge may not even be running MSTP and therefore have no concept of multiple instances.

In operation, as will be described in greater detail below, an embodiment of ATF logic included on a bridge automatically identifies and configures ports of the thus ATF-enabled bridge with 802.1Q VLAN tags to ensure connectivity of VLANs and their traffic within MST regions. The ATF logic identifies ports that are facing other MSTP switches in the same region. Then, in accordance with the configuration parameters, it assigns the appropriate VLAN tags to the ports on a per-MSTI basis. Each link that the ATF logic identifies as valid will be between bridges within the same region; thus, both ends of the link will have matching dynamic VLAN assignments. This results in a flat VLAN topology in connection with which MSTP can form any STP topology without losing connectivity. As will be described, the ATF logic reacts to configuration and dynamic spanning tree status to ensure that MSTP trunk ports are valid and that they have all of the tags necessary.

In this manner, ATF logic creates one or more VLAN topologies based on the possible spanning tree topologies by interpreting various STP port states (e.g., "forwarding," "blocking") associated with each link. ATF logic effectively implements the concept of "VLAN Configuration Follows STP" for layer 2 network design. As previously noted, although GVRP alone is deficient in many respects as a complete solution to the problem addressed by the present embodiment, it can be used in conjunction with the embodiment for configuring edge and inter-region boundary links.

As used herein, a port is "Trunk Active" when it meets the criteria for ATF logic to add tags at the port and it is either configured active or auto-port selection is enabled; a port is "Trunk Inactive" when it fails to meet the those criteria. A port is "Trunk Enabled" when it is configured to be enabled for ATF; a Trunk Enabled port becomes Trunk Active when all of the aforementioned criteria for Trunk Active are met. An MSTP "trunk group" is a group of one or more VLANs on a bridge that are mapped to an MSTI. A trunk group is defined by mapping a set of VLANs to an MSTI instance that is Trunk Enabled. For the present embodiment to be active, the following configuration conditions must be met: (1) STP operation must be enabled; and (2) STP protocol must be set to MSTP.

FIG. 1 is a block diagram of a network 100 in which an exemplary embodiment of ATF may be implemented. The network 100 includes six bridges B1-B6 and four end-user devices, e.g., personal computers, P1-P4. The bridges B1-B6 are configured into two regions R1 and R2. Specifically, the bridges B1-B4 comprise the region R1 and the bridges B5 and B6 comprise the region R2. A plurality of physical links L1-L14 interconnect the various bridges B1-B6 and end-user devices P1-P4. Applying the rules of an embodiment of ATF to the network 100, the following statements may be made. First, the links L1-L4 connecting the end-user devices P1-P4 and the bridges B1, B2, B5, and B6, are connected to edge ports of the those bridges and are therefore are not eligible for Trunk Active status. In addition, the links L5 and L6 span region boundaries and are therefore also not eligible for Trunk Active status.

The actions taken by ATF logic when enabled on each of the bridges B1-B6 will depend on the configuration desired by the administrator. Generally, whether auto-port detection is used or the ports are manually configured to trunking, the results should be the same to conserve connectivity. In particular, the ports to which the links L7-L12 are connected should all be Trunk Enabled; thus, the MSTIs that are enabled will have their assigned VLANS added as tags to these ports. Additionally, the ports to which the links L13 and L14 are connected should be Trunk Enabled. The inter-regional links L5 and L6 will need to be statically configured with the VLANs that are to be shared across the regions R1, R2. They should be added to both links in case a change in the CIST topology causes one of the links L5, L6, to block. The edge ports to which the links L1-L4 are connected may be configured as Admin-Edge or Mobile or static configuration may be used. ATF logic will recognize them as edge ports and assign no dynamic tags thereto.

If both GVRP and ATF are active on the network 100, the GVRP-learned VLANs will be assigned on all of the Trunk Active ports automatically by ATF logic (if they are mapped to a trunk-enabled MSTI) as they are received by GVRP, while advertisements will still be propagated. GVRP will add the tags to the inter-regional and edge ports as necessary. GVRP will consider ATF tag assignments static assignments, since they are not affected by Leave or LeaveAll type events.

Figure 2:
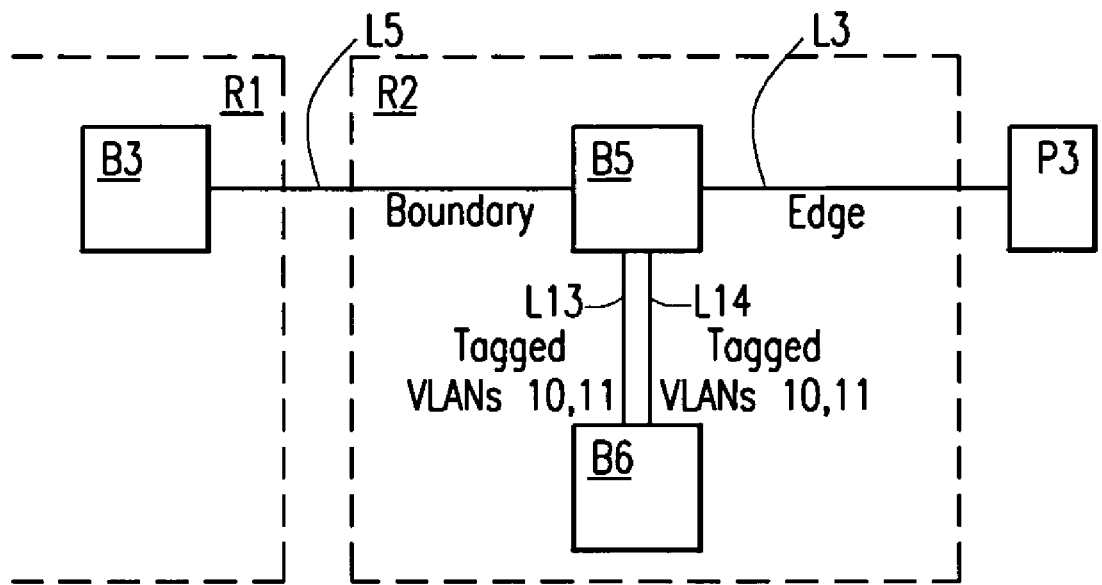
FIG. 2 is a system block diagram of a portion of the network of FIG. 1 illustrating an aspect of an embodiment.

Focusing now on the bridge B5 and referring to FIG. 2, as previously noted, bridges B5 and B6 are configured into the same region (region R2); bridge B3 is in another region (region R1). The bridges B5 and B6 are configured with two MSTI, including MSTI1 and MSTI2.

The following assumptions will be made for the sake of example. The configured VLANs on bridges B5 and B6 are 1, 10, and 20. The MST settings are the same on B5 and B6 and the VLAN to MSTI map is as follows:

CIST: VLANs 1, 2-9, 11-19, 21-4095
MSTI1: VLAN 10
MSTI2: VLAN 20

The bridge B6 is the regional root of MSTI1; the bridge B5 is the regional root of MSTI2. The CIST trunk is disabled. All ports are default VLAN 1. The bridge B3 is in another region (i.e., region R1) and the end-user device P3 is a PC with no special protocols running thereon.

Initialization and trunk port selection in accordance with one embodiment will now be described in connection with FIG. 2. Based on the preceding assumptions, initially, all ports are considered boundary ports and (depending on the underlying version of STP being implemented) non-edge. Each port can be statically configured as Trunk Enabled or the bridge can use auto-port selection to dynamically determine the MSTP trunk ports.

The link L5 will be now be considered. First, the port to which the link is connected is initialized. Next, the port receives an MSTP BPDU from the bridge B3. The BPDU has different region encoding; therefore, the port remains a boundary port. Even if ATF is enabled for the port, the port remains Trunk Inactive and no tags are added.

Turning now to the link L3, the port to which the link is connected is initialized. Because the link L3 is connected to the end-user device P3, which does not generate BPDUs, no BPDU will be received. After some period of time has expired, the port is determined to be an edge port. It will be recognized that edge detection methods may differ with different versions of MSTP (e.g., 802.1Q 2005 vs. 802.1S). Even if the port is configured Trunk Enabled, it will have no tags added.

Turning next to the link L13, the port to which the link is connected is initialized and the port receives an MSTP BPDU from the bridge B6. The BPDU corresponds to the same STP version and Region, indicating that the link L13 interconnects bridges within a single region, so the port is designated non-boundary. ATF logic configures the port as Trunk Active and VLANs 10 and 20 are tagged to this port. The same process occurs with respect to the link L14 and the port to which it is connected. As a result, the links between bridges that are in the same region are tagged with the VLANs that are members of the active instances.

As previously noted, a feature of an embodiment of ATF is the manner in which it responds to changes in a network, such as the network 100. One such change is creation of a VLAN.

Figure 3:
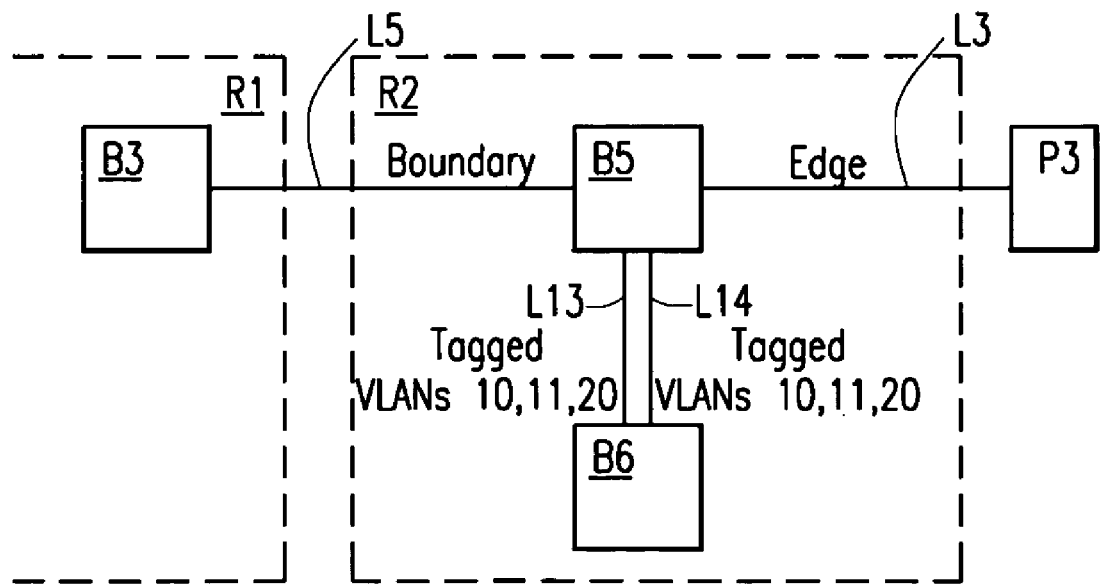
FIG. 3 is a system block diagram of a portion of the network of FIG. 1 illustrating another aspect of an embodiment.

Referring now to FIG. 3 and retaining the assumptions made with respect to FIG. 2, it will be assumed for the sake of example that new VLAN (VLAN 11) is created on bridges B5 and B6. By default, the VLAN is assigned to the CIST, which is Trunking Disabled, so no action is taken in connection with the CIST. The VLAN 11 is mapped to MSTI 1 on B5 and B6. ATF logic is informed of the VLAN map change, at which point it scans the Trunk Active ports and adds VLAN 11 as a tag to the ports on which the VLAN is not already present. This process results in the ports to which the links L3 and L14 are connected are identified as Trunk Active and do not have VLAN 11 as a default or tagged VLAN; therefore, ATF logic tags those ports with VLAN 11.

Figure 4:
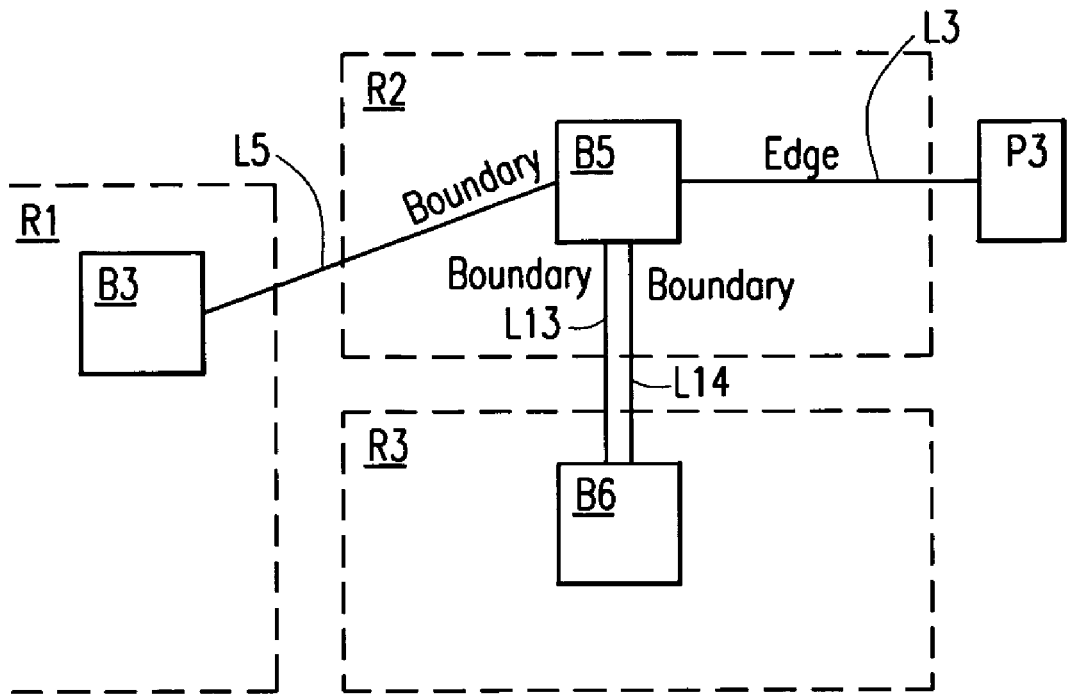
FIG. 4 is a system block diagram of a portion of the network of FIG. 1 illustrating another aspect of an embodiment.

Next, a network change involving the change in an MST region to which a bridge is assigned will be addressed. Referring now to FIG. 4 and retaining the assumptions made with respect to FIG. 2, it will be assumed for the sake of example that the network 100 has undergone some change in configuration that removes the bridge B6 from the region R2. Thereafter, the bridge B5 receives BPDUs on links L13 and L14 that have mis-matched regional information; as a result, the ports to which the links L13 and L14 are connected are designated boundary ports. ATF logic then untags VLANs 10 and 20 from links L13 and L14.

Figure 5:
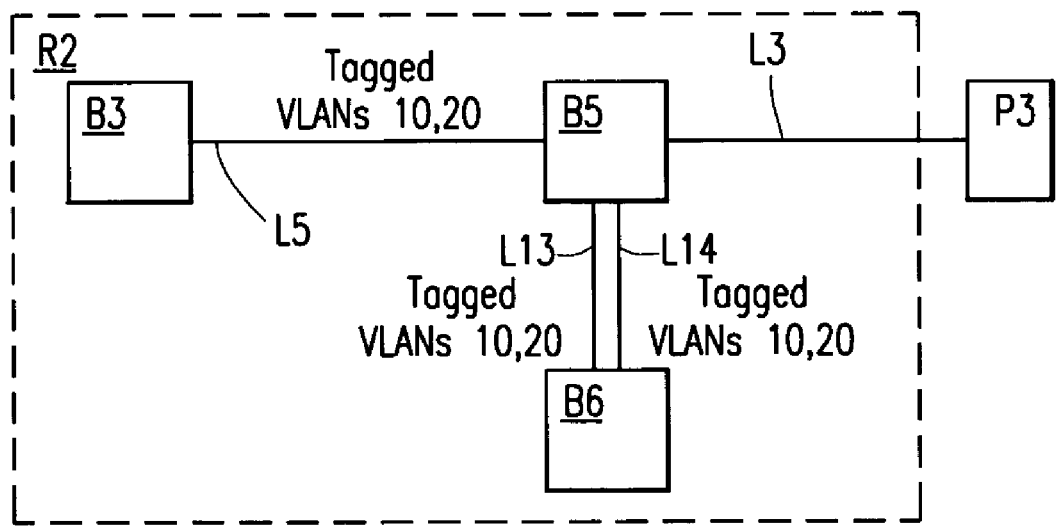
FIG. 5 is a system block diagram of a portion of the network of FIG. 1 illustrating another aspect of an embodiment.

Next, another network change involving the change in an MST region to which a bridge is assigned will be addressed. Referring now to FIG. 5 and retaining the assumptions made with respect to FIG. 2, it will be assumed for the sake of example that the bridge B3 is administratively changed to bring it into the region R2. The bridge B5 receives a BPDU from the bridge B3, the result of which is that the port to which the link L5 is designated non-boundary. The ATF logic is notified and the VLANs 10 and 20 are tagged on the port to which the link L5 is connected.

It will be recognized that various actions can cause a port to become Trunk Active or Trunk Inactive. These actions include, for example, a bridge region change, a protocol change on a neighboring device, a new link in the network, an administrative change on a local bridge, or disabling of STP on a neighboring device.

Figure 6:
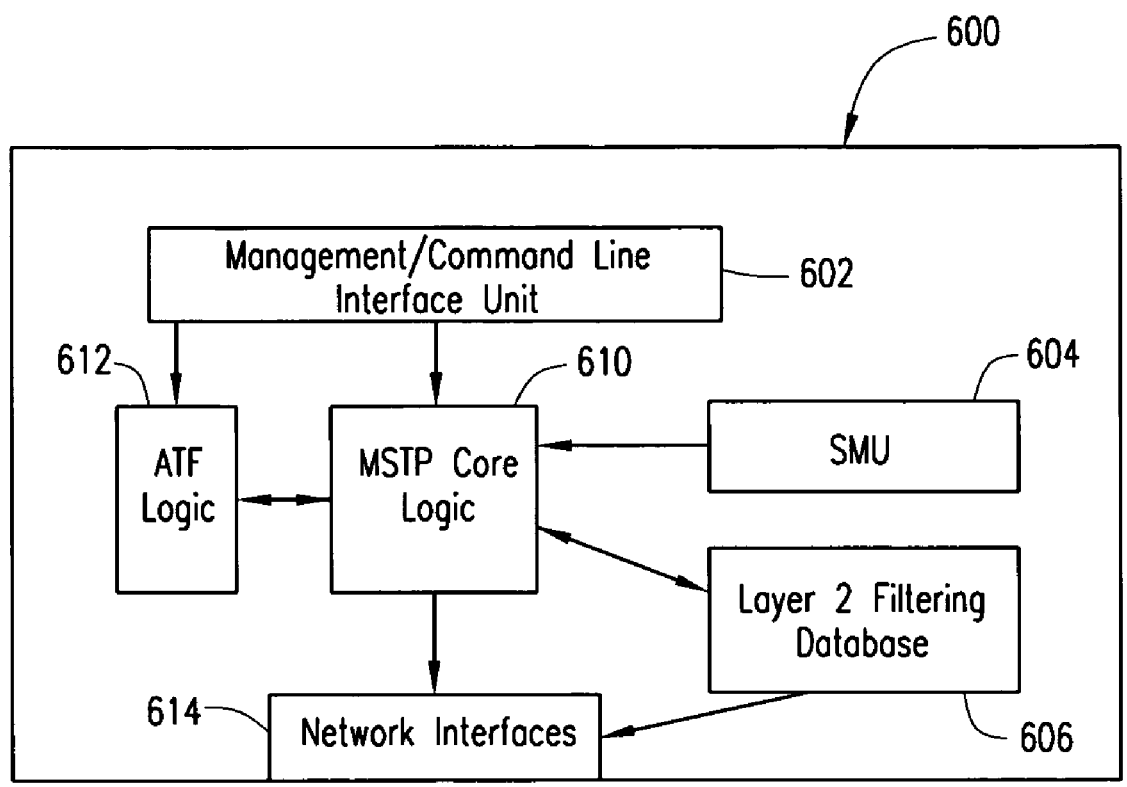
FIG. 6 is a block diagram of a bridge for implementing an embodiment.

FIG. 6 is a block diagram of a bridge 600 for implementing the teachings of the embodiments described herein. As illustrated in FIG. 6, the bridge 600 includes a set of Command Line Interface ("CLI") and Simple Network Management Protocol ("SNMP") modules, collectively illustrated as a management and CLI unit 602, that enable a user to configure the bridge 600. The bridge 600 further includes a system monitoring unit ("SMU") 604 comprising logic for monitoring the physical status of the bridge 600 (e.g., link up, link down, etc.) and a Layer 2 ("L2") filtering database 606 embodying the logical entity of the bridge 600 as described in the IEEE 802.1D specification, including VLAN membership tables and a MAC address database for the bridge 600.

MSTP core logic 610 comprises all of the logic for implementing MSTP, as described in one or both of the IEEE standards (802.1S and 802.1Q). In particular, the logic 610 includes all of the logic for implementing forwarding and blocking on various ports of the bridge 600, BPDU processing and transmission, and other functions necessary for implementing MSTP. ATF logic 612 comprises the core logic for implementing the functions of ATF, including monitoring STP status and setting sand creating trunks by informing the L2 filtering database 606 of VLAN memberships. Finally, one or more network interfaces, represented in FIG. 6 by network interfaces 614, comprise the hardware and drivers for the bridge 600 and ports for controlling packet insertion and reception and for implementing the STP forwarding and blocking mechanism.

Figure 7:
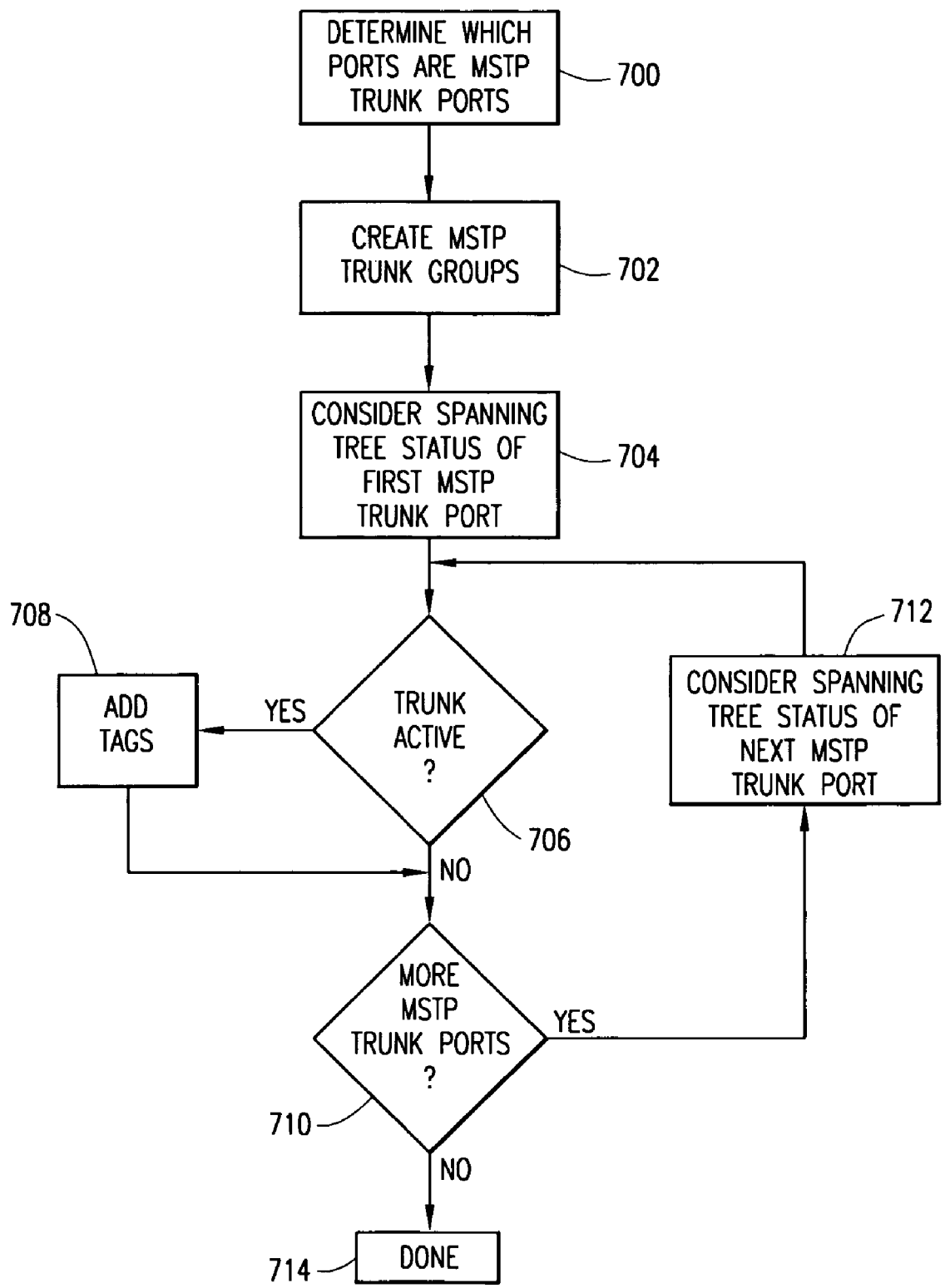
FIG. 7 is a flowchart of the operation of automatic trunk formation logic of the bridge of FIG. 6 in accordance with one embodiment.

FIG. 7 is a flowchart illustrating operation of the ATF logic in accordance with an embodiment. First, one or more ports on each bridge are determined to be MSTP trunk ports (block 700). In the embodiments described herein, MSTP trunk ports have their VLAN memberships determined by MSTP only. Next, a VLAN-MSTI map must be taken into account by forming a group of VLANs belonging to each instance. Each of these groups of VLANs comprises a MSTP trunk group (block 702). Only VLANs that have entries in the bridge's static database will be considered for membership in an MSTP trunk group.

At that point, the spanning tree status of a first one of the MSTP trunk ports is considered (block 704) and a determination is made whether the port is Trunk Active (block 706). If so, all of the VLANs in the MSTP trunk groups of the MSTIs that are forwarding on the port are added as 802.1Q tagged members of the port (block 708). As a result, membership of the important VLANs for the MSTIs that are forwarding on a port are members, so that in the case of redundant links connectivity is ensured between two bridges for the common VLANs between the bridges.

If the MSTP trunk port under consideration is determined not to be Trunk Active, or of the MSTP trunk port under consideration is determined to be Trunk Active, then after the tags are added, a determination is made whether there are more MSTP trunk ports to be considered (block 710). If so, the spanning tree status of the next MSTP trunk port is considered (block 712). Otherwise, execution terminates (block 714).

The ATF logic illustrated in FIG. 7 is triggered whenever a port moves to forwarding for any MSTI. Thus, topology changes will not negatively impact the connectivity of the VLANs. When a port that is an MSTP trunk port goes from forwarding to blocking, it may be desirable for the tags added by ATF logic to be removed; however, this is not critical to the embodiment. In any event, failure to remove the tags in this situation will not result in any network instability, as the port is a blocking port.

It is possible for security purposes that some VLANs not be automatically added by ATF logic. Additionally, it may be important to have a per-MSTI control over which MSTIs and thus the VLANs belonging to those MSTIs, are actually used as trunks. The administrator of the bridge may require strict control over which VLANs are automatically trunked. Further administrative control can be seen in that ports designated as MSTP trunk ports can be restricted from manual 802.1Q tag configuration.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method for performing automatic trunk formation in a multiple spanning tree protocol ("MSTP")-enabled bridge comprising a plurality of ports, the method comprising:
    determining which ones of the ports comprise MSTP trunk ports;
    forming an MSTP trunk group for each multiple spanning tree instance ("MSTI") comprising a group of Virtual Local Area Networks ("VLANs") belonging to the MSTI; and
    for each of the MSTP trunk ports, determining whether a status of the MSTP trunk port is trunk active and if so, adding all VLANs in the MSTP trunk group of the MSTIs that are forwarding on the MSTP trunk port as tagged members of the MSTP trunk port;
    wherein the determining whether the status of the MSTP trunk port is trunk active comprises determining whether the port is an edge port and if so, determining that the MSTP trunk port status is not trunk active.

2. The method of claim 1 wherein VLAN memberships of each of the MSTP trunk ports are determined by MSTP logic of the bridge.

3. The method of claim 1 wherein the determining whether the status of the MSTP trunk port is trunk active further comprises determining whether the port is a boundary port and if so, determining that the MSTP trunk port status is not trunk active.

4. The method of claim 1 wherein initiation of the determining is triggered responsive to movement of an MSTP trunk port to forwarding for any MSTI.

5. The method of claim 1 further comprising, responsive to an MSTP trunk port moving from forwarding to blocking for an MSTI, removing all VLANs in the MSTP trunk group of the MSTIs that are blocking on the MSTP trunk port as tagged members of the MSTP trunk port.

6. The method of claim 1 further comprising assigning a high path cost to MSTP trunk ports that are not forwarding for any MSTI.

7. The method of claim 1 further comprising, for each VLAN, determining whether the VLAN is prevented from being automatically added to an MSTP trunk group and if so, preventing the VLAN from being automatically added to an MSTP trunk group during the forming.

8. The method of claim 1 further comprising restricting MSTP trunk ports from being manually configured.

9. A method of implementing automatic trunking in a multiple spanning tree protocol ("MSTP")-enabled bridge comprising a plurality of ports, the method comprising:
    responsive to initialization of the bridge, identifying which ones of the plurality of ports comprise MSTP trunk ports;
    for each MSTP trunk port, for each multiple spanning tree instance ("MSTI") for which the trunk port is forwarding, adding virtual local area networks ("VLANs") belonging to the MSTI as a tagged member of the MSTP trunk port;
    wherein the identifying comprises:
        determining whether the port is an edge port; and
        responsive to a determination that the port is an edge port,
    identifying the port as a non-MSTP trunk port.

10. The method of claim 9 further comprising, responsive to a change in a spanning tree topology of a network in which the bridge is a member, repeating the identifying and adding.

11. The method of claim 9 further comprising, responsive to a change in a region in which the bridge is located, repeating the identifying and adding.

12. The method of claim 9 wherein the identifying further comprises:
    determining whether the port is a boundary port; and
    responsive to a determination that the port is a boundary port, identifying the port as a non-MSTP trunk port.

13. A bridge for performing automatic trunk formation, the bridge comprising a plurality of ports and further comprising:
   multiple spanning tree protocol ("MSTP") logic; and
   automatic trunk formation ("ATF") logic for determining which ones of the plurality of ports comprise MSTP trunk ports; forming an MSTP trunk group for each multiple spanning tree instance ("MSTI") comprising a group of Virtual Local Area Networks ("VLANs") belonging to the MSTI; for each of the MSTP trunk ports, determining whether a status of the MSTP trunk port is trunk active and if so, adding all VLANs in the MSTP trunk group of the MSTIs that are forwarding on the MSTP trunk port as tagged members of the MSTP trunk port;
   wherein the determining whether the status of the MSTP trunk port is trunk active comprises determining whether the port is an edge port and if so, determining that the MSTP trunk port status is not trunk active.

14. The bridge of claim 13 wherein VLAN memberships of each of the MSTP trunk ports are determined by the MSTP logic.

15. The bridge of claim 13 wherein initiation of execution of the ATF logic is triggered responsive to movement of an MSTP trunk port to forwarding for any MSTI.

16. The bridge of claim 13 wherein responsive to an MSTP trunk port moving from forwarding to blocking for an MSTI, all VLANs in the MSTP trunk group of the MSTIs that are blocking on the MSTP trunk port are removed as tagged members of the MSTP trunk port.

17. The bridge of claim 13 wherein a high path cost is assigned to MSTP trunk ports that are not forwarding for any MSTI.

18. The bridge of claim 13 wherein the ATF logic further determines for each VLAN whether the VLAN is prevented from being automatically added to an MSTP trunk group and if so, preventing the VLAN from being automatically added to an MSTP trunk group during the forming.

19. The bridge of claim 13 wherein certain MSTP trunk ports are restricted from being manually configured.

20. A system for performing automatic trunk formation in a multiple spanning tree protocol ("MSTP")-enabled bridge comprising a plurality of ports, the system comprising:
   means for determining which ones of the plurality of ports comprise MSTP trunk ports;
   means for forming an MSTP trunk group for each multiple spanning tree instance ("MSTI") comprising a group of Virtual Local Area Networks ("VLANs") belonging to the MSTI;
   means for determining for each of the MSTP trunk ports whether a status of the MSTP trunk port is trunk active and if so, adding all VLANs in the MSTP trunk group of the MSTIs that are forwarding on the MSTP trunk port as tagged members of the MSTP trunk port; and
   means, responsive to an MSTP trunk port moving from forwarding to blocking for an MSTI, for removing all VLANs in the MSTP trunk group of the MSTIs that are blocking on the MSTP trunk port as tagged members of the MSTP trunk port.

21. The system of claim 20 further comprising means for assigning a high path cost to MSTP trunk ports that are not forwarding for any MSTI.

22. The system of claim 20 further comprising, for each VLAN, means for determining whether the VLAN is prevented from being automatically added to an MSTP trunk group and if so, for preventing the VLAN from being automatically added to an MSTP trunk group by the means for forming.

23. The system of claim 20 further comprising means for restricting MSTP trunk ports from being manually configured.

* * * * *

UNITED STATES PATENT AND TRADEMARK OFFICE
CERTIFICATE OF CORRECTION

PATENT NO. : 7,580,372 B2  Page 1 of 1
APPLICATION NO. : 11/300786
DATED : August 25, 2009
INVENTOR(S) : Touve et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this

Fourteenth Day of September, 2010

David J. Kappos
*Director of the United States Patent and Trademark Office*